(12) United States Patent
Mask, III et al.

(10) Patent No.: US 12,294,253 B2
(45) Date of Patent: May 6, 2025

(54) ELECTRIC MOTOR FAN COVER, END BELL INTERFACE, AND RADIALLY MOUNTED BRUSH HOLDER

(71) Applicant: ABB Schweiz AG, Baden (CH)

(72) Inventors: Robert J. Mask, III, Greenwood, AR (US); Mark J. Sharum, Fort Smith, AR (US); Bevan J. Christiansen, Greenwood, AR (US)

(73) Assignee: ABB Schweiz AG, Baden (CH)

( * ) Notice: Subject to any disclaimer, the term of this patent is extended or adjusted under 35 U.S.C. 154(b) by 259 days.

(21) Appl. No.: 17/987,128

(22) Filed: Nov. 15, 2022

(65) Prior Publication Data

US 2024/0162792 A1     May 16, 2024

(51) Int. Cl.
| | |
|---|---|
| *H02K 11/40* | (2016.01) |
| *F16C 41/00* | (2006.01) |
| *H01R 39/12* | (2006.01) |
| *H01R 39/38* | (2006.01) |
| *H02K 5/14* | (2006.01) |
| *H02K 9/06* | (2006.01) |

(52) U.S. Cl.
CPC ............. *H02K 11/40* (2016.01); *H01R 39/38* (2013.01); *H01R 39/385* (2013.01); *H02K 5/148* (2013.01); *H02K 9/06* (2013.01); *F16C 41/002* (2013.01); *H01R 39/12* (2013.01)

(58) Field of Classification Search
CPC .......... H02K 11/40; H02K 5/148; H02K 5/15; H01R 39/12; H01R 39/64
USPC ........................................................ 310/220
See application file for complete search history.

(56) References Cited

U.S. PATENT DOCUMENTS

| | | | | |
|---|---|---|---|---|
| 2,516,608 | A * | 7/1950 | Wightman | H01R 39/41 310/247 |
| 2,548,631 | A * | 4/1951 | Stapleton | H01R 39/41 439/28 |
| 2,883,567 | A * | 4/1959 | Schneider | H02K 5/148 310/239 |
| 2,894,156 | A * | 7/1959 | Kent | H02K 23/04 310/410 |

(Continued)

FOREIGN PATENT DOCUMENTS

| | | | |
|---|---|---|---|
| CN | 105375228 A | * | 3/2016 |
| CN | 109347287 A | | 2/2019 |

(Continued)

OTHER PUBLICATIONS

Translatio of CN 105375228 A (Year: 2016).*

(Continued)

*Primary Examiner* — Michael Andrews
*Assistant Examiner* — Daniel K Schlak
(74) *Attorney, Agent, or Firm* — Leydig, Voit & Mayer, Ltd.

(57) ABSTRACT

A system for mitigating induced currents in an electric motor having a shaft includes: a brush holder having a handle end, the brush holder having: a brush holder handle at the handle end; and a shaft grounding brush attached to the brush holder handle, the shaft grounding brush including a contact at a contact end of the brush holder, the contact end being opposite the handle end; and an end bell of the electric motor, the end bell receiving the contact end of the brush holder such that the contact of the shaft grounding brush contacts the shaft.

18 Claims, 6 Drawing Sheets

(56) References Cited

U.S. PATENT DOCUMENTS

| | | | | |
|---|---|---|---|---|
| 3,135,887 | A * | 6/1964 | Schaffan | H02K 15/16 |
| | | | | 310/239 |
| 3,308,321 | A * | 3/1967 | Provost, Jr. | H01R 39/58 |
| | | | | 310/239 |
| 3,849,684 | A * | 11/1974 | Duncan | H01R 39/41 |
| | | | | 310/242 |
| 4,355,254 | A * | 10/1982 | Oki | H01R 39/40 |
| | | | | 310/239 |
| 4,954,084 | A | 9/1990 | Pugh et al. | |
| 5,661,356 | A * | 8/1997 | Fisher | H01R 39/12 |
| | | | | 439/29 |
| 7,352,103 | B2 * | 4/2008 | Shawcross | H02K 5/148 |
| | | | | 310/239 |
| 7,608,970 | B2 | 10/2009 | Eger et al. | |
| 2007/0201995 | A1 * | 8/2007 | Harstad | F04D 29/023 |
| | | | | 417/423.12 |
| 2007/0222327 | A1 * | 9/2007 | Li | H01R 39/38 |
| | | | | 310/90 |
| 2014/0369821 | A1 | 12/2014 | Finck | |
| 2017/0070020 | A1 * | 3/2017 | Koenitzer | H01R 39/12 |
| 2019/0334407 | A1 * | 10/2019 | Kato | F16C 17/02 |
| 2022/0140557 | A1 | 5/2022 | Cutsforth | |
| 2024/0063695 | A1 * | 2/2024 | Matthey | H01R 39/38 |

FOREIGN PATENT DOCUMENTS

| | | | | |
|---|---|---|---|---|
| DE | 19712194 | A1 * | 9/1998 | H02K 11/40 |
| JP | 2003257579 | A * | 9/2003 | |

OTHER PUBLICATIONS

Translation of DE 19712194 A1 (Year: 1998).*
Translation of JP 2003257579 A (Year: 2003).*
European Patent Office, Extended European Search Report in European Patent Application No. 23210048.7, 9 pp. (Apr. 2, 2024).
Abb Oy, "Grounding and cabling of drive systems," reference manual, 42 pp. (Mar. 25, 2013).
Baldor, "Inverter-Driven Induction Motors Shaft and Bearing Current Solutions," industry white paper, 46 pp.
Baldor, "Shaft Voltage and Bearing Current," product brochure, 26 pp.
Electro Static Technology, "Aegis® Shaft Grounding Ring Bearing Protection Handbook," product brochure, 48 pp. (2013).
Helwig Carbon Products, Inc., "Motor, Generator & Slip Ring Brushes," product brochure, 1 p.
Koenitzer, "Shaft Grounding and Sliding Electrical Contacts," Helwig Carbon Products, Inc., Milwaukee, WI, 12 pp. (Dec. 2016).
Melfi, "Different Types of Bearing Currents—The Fundamentals," *ASHRAE Transactions*, 114: 240 (2008).

* cited by examiner

ELECTRIC MOTOR FAN COVER, END BELL INTERFACE, AND RADIALLY MOUNTED BRUSH HOLDER

FIELD

The present disclosure generally relates a device and a system for mitigating induced currents in the bearings of electric motors.

BACKGROUND

In general, electric motors experience shaft-induced electrical currents, particularly in the bearings mounted to the shaft. Over time, the electrical currents can have negative effects, including bearing damage and failure, as well as potential arcing to nearby components and even people.

Several solutions have been developed to mitigate shaft-induced electrical currents. One solution is to incorporate a spring-loaded brush, or shaft grounding brush ("SGB"), in order to ground the shaft, as the SGB provides a continuous flow of current to ground, avoiding buildup of charge in the shaft. An SGB is typically externally mounted to the end bell of the electric motor, which also serves as a flange. But if the SGB is installed externally it can interfere with the normal and safe installation of the flange. If the SGB is instead installed internally, the SGB is typically secured to the motor end bell using a small bracket around the bearing housing. The brush of the SGB can be made, for example, of a graphite material, which is a semi-crystalline form of carbon, and can include other components, such as silver.

Figures 1, 2:
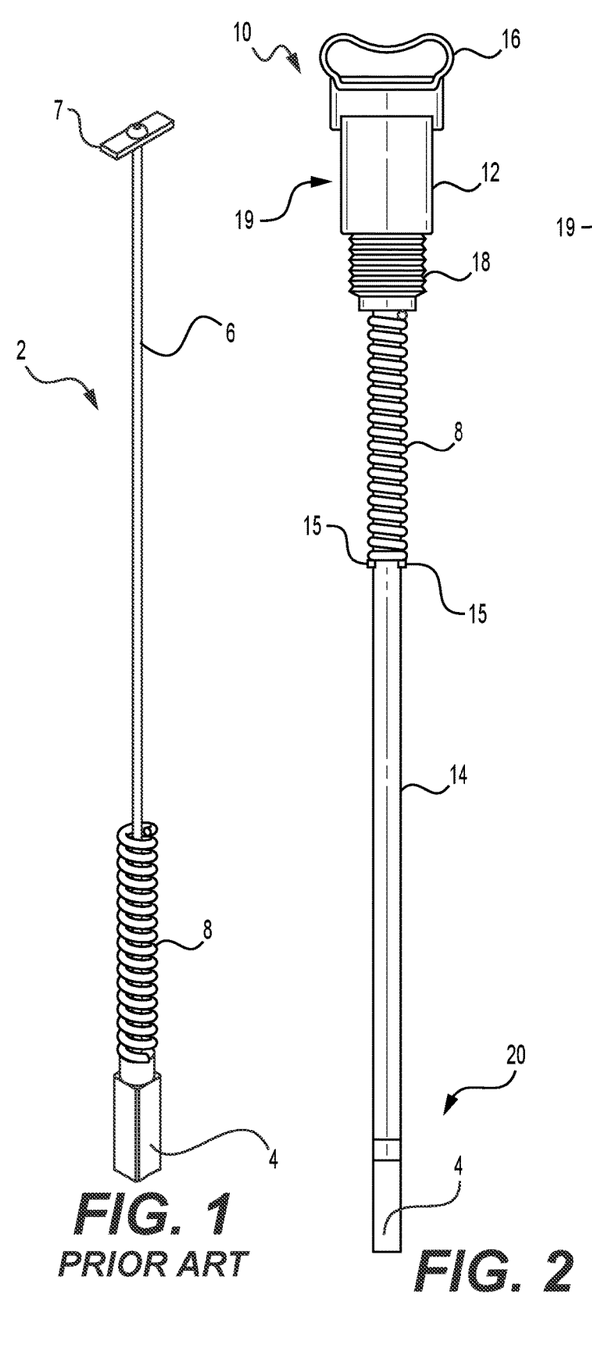
FIG. 1 shows a shaft grounding brush according to the prior art.
FIG. 2 shows a brush holder according to the present disclosure.

FIG. 1 of the present application shows an exemplary SGB 2. SGB 2 includes a contact 4 for making contact with the shaft of an electric motor. Contact 4 is mounted on a stem 6, which can extend collinearly with respect to contact 4. Stem 6 includes a tab 7, which could be made of brass. A spring 8 is arranged circumferentially around stem 6 to exert tension on contact 4 in order to push contact 4 into sliding contact with the shaft of the electric motor, creating a path to ground through SGB 2.

Whether an SGB is installed externally or internally, use of SGBs as a grounding solution is sometimes discouraged in the art because the contact and/or spring of the SGB wears out over time and needs to be replaced, which typically necessitates replacement of the SGB as a whole. Replacing conventional SGBs can be a difficult and time-consuming task, as it currently requires disassembly of the electric motor. Due to the difficultly of effectively maintaining SGBs, rotating equipment manufacturers and distributors typically maintain inventory of other products that are dedicated to applications that require shaft grounding, Examples of such other inventory include insulated or ceramic-coated bearings. Holding such specialized inventory results in increased costs.

SUMMARY

In an embodiment, the present invention provides a system for mitigating induced currents in an electric motor having a shaft, the system comprising: a brush holder having a handle end, the brush holder comprising: a brush holder handle at the handle end; and a shaft grounding brush attached to the brush holder handle; the shaft grounding brush including a contact at a contact end of the brush holder, the contact end being opposite the handle end; and an end bell of the electric motor, the end bell being configured to receive the contact end of the brush holder such that the contact of the shaft grounding brush is configured to contact the shaft.

DETAILED DESCRIPTION

To overcome the problems associated with prior art shaft grounding applications, the present application describes an externally mounted device capable of being retrofitted to existing electric motors, avoiding the need to inventory dedicated bearing current mitigation motor systems. As an alternative to maintaining such inventory, the present application describes a system that provides an externally mounted brush holder that does not necessitate disassembly of the electric motor in order to install, service, or replace the SGB.

FIG. 2 shows an embodiment of the brush holder 10 according to the present disclosure. Brush holder 10 includes a brush holder handle 12 mounted to a brush holder extension 14. Brush holder handle 12 has a grasping portion 16 that allows an individual to grasp brush holder 10. Brush holder handle 12 can be made of plastic, metal, or a two-piece combination such as metal/plastic or metal; rubber.

Brush holder extension 14 can be a generally cylindrical hollow component having a diameter that is larger than a width of stem 6 of SGB 2. In this manner, an SGB 2 can be disposed within (i.e., radially inward of) brush holder extension 14 and mounted to brush holder handle 12 so as to be disposed within brush holder 10. Alternatively, brush holder extension 14 can be a solid rod with contact 4 affixed to one end thereof. Brush holder extension 14 could be made of metal or plastic.

Spring S is disposed circumferentially on brush holder extension 14 so as to be generally between brush holder handle 12 and brush holder extension 14. Alternatively, spring 8 could be disposed within brush holder extension 14. Brush holder extension 14 includes one or more detents 15 mounted thereon so as to hold spring 8 in place between detents 15 and brush holder handle 12. Spring 8 is therefore capable of extending between brush holder handle 12 and detents 15 so as to exert tension on brush holder extension 14, pushing contact 4 into contact with the shaft of the electric motor to which brush holder 10 is affixed. Spring 8 could alternatively be an elastomer that exerts a similar tension on brush holder extension 14 so as to push contact 4.

In an embodiment, brush holder handle 12 includes threads 18 circumferentially arranged at a handle end 19 of brush holder 10, on brush holder handle 12 opposite grasping portion 16 thereof. Threads 18 allow brush holder 10 to be fixed (e.g., screwed in) to a component of an electric motor at handle end 19, such that contact 4 of SGB 2 comes into contact with the shaft of the electric motor. For example, turning brush holder 10 and threads 18 by a quarter turn could secure brush holder 10 to the electric motor. As an alternative to threads 18, brush holder 10 could be secured to the electric motor by snap fit or press fit, for example. When SGB 2 is mounted to brush holder 10, contact 4 extends past an end of brush holder extension 14 so that contact 4 can contact the shaft of the electric motor. Contact 4 can optionally be attached to an end of brush holder extension 14, for example, by slip fit, press fit, adhesive, or crimping.

Figure 3:
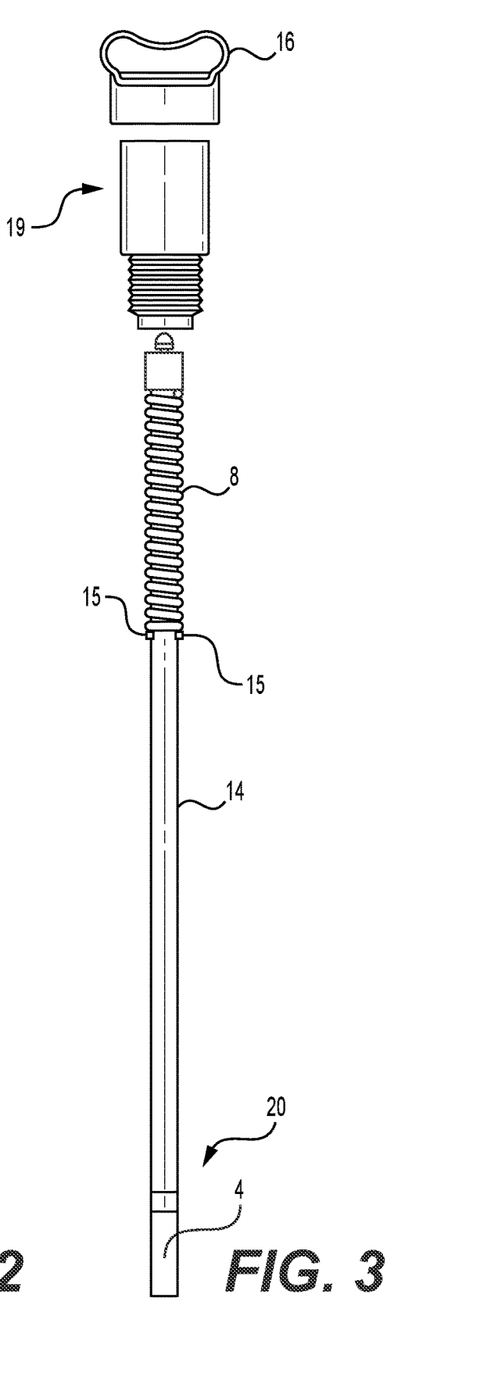
FIG. 3 shows an exploded view of the brush holder of FIG. 2.

FIG. 3 is an exploded view showing the components of FIG. 2, namely brush holder extension 14 and brush holder handle 12 with its grasping portion 16, and with SOB 2. As can be seen in FIG. 3, a portion of brush holder extension 14 extends into brush holder handle 12, and the portion of stem 6 of SGB 2 that includes tab 7 extends beyond brush holder extension 14 in the direction of brush holder handle 12. Tab 7 of stem 6 can be tethered to brush holder handle 12, for example, by slip fit, by driving tab 7 through brush holder handle 12. Brush holder extension 14 with spring 8 can then be placed onto SGB 2. SGB 2 can be removed from brush holder handle 12 by pulling brush holder extension 14 through brush holder handle 12, which requires removal of spring 8, contact 4, and any other securing components (e.g., detents 15).

Figures 4, 5:
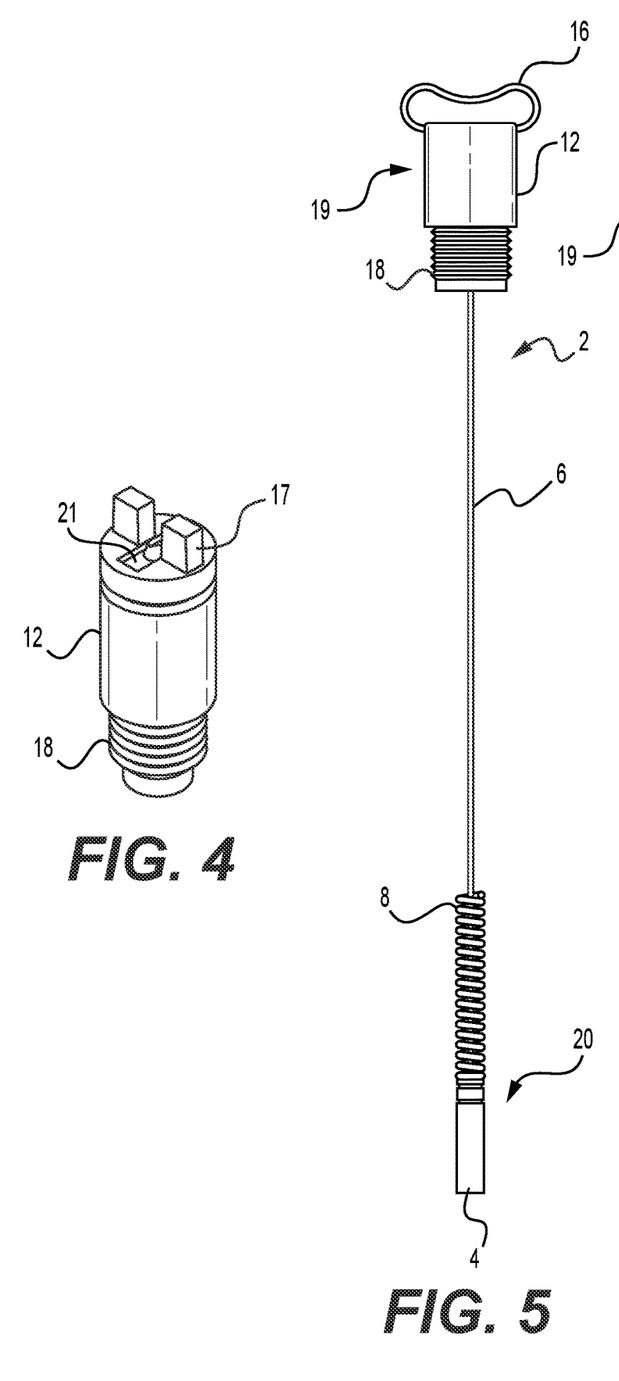
FIG. 4 shows an alternative embodiment of a brush holder handle according to the present disclosure.
FIG. 5 shows an alternative embodiment of a brush holder according to the present disclosure.

FIG. 4 shows an alternative embodiment of brush holder handle 12. Rather than grasping portion 16, brush holder handle 12 instead includes a proprietary interface 17 so as to enable rotation of brush holder 10 with respect to the electric motor with which brush holder 10 is intended to be used. Proprietary interface 17 is configured to be rotatable using a proprietary tool (e.g., a tool included in a replacement SGB kit). Proprietary interface 17 prevents brush holder 10 from being removed from or tightened with respect to the electric motor without using a proprietary tool. As a further alternative, brush holder handle 12 could instead include a standard interface configured to be rotated by a standardized tool (e.g., a Philips screwdriver). FIG. 4 also shows tab rest 21 that accommodates tab 7 of SGB 2 when SGB 2 is affixed to brush holder 10. Specifically, SGB 2 can be pushed downward into brush holder handle 12 and, optionally, into brush holder extension 14, with tab 7 ultimately resting on tab rest 21. Brush holder handle 12 in FIG. 3 includes the same configuration with tab rest 21.

In an alternative embodiment shown in FIG. 5, brush holder 10 does not include brush holder extension 14. In this manner, SGB 2 is still tethered to brush holder handle 12 via tab 7 and tab rest 21, and brush holder handle 12 has threads 18 arranged circumferentially thereon at handle end 19 so as to allow brush holder handle 12 (and therefore SGB 2) to be fixed (e.g., screwed in) to a component of an electric motor near brush holder handle 12. In this embodiment, the one or more detents 15 could instead be mounted on stem 6 rather than on brush holder extension 14. Spring 8 would then be held in place between the one or more detents 15 and brush holder handle 12, as shown in FIGS. 2-3.

Figure 6:
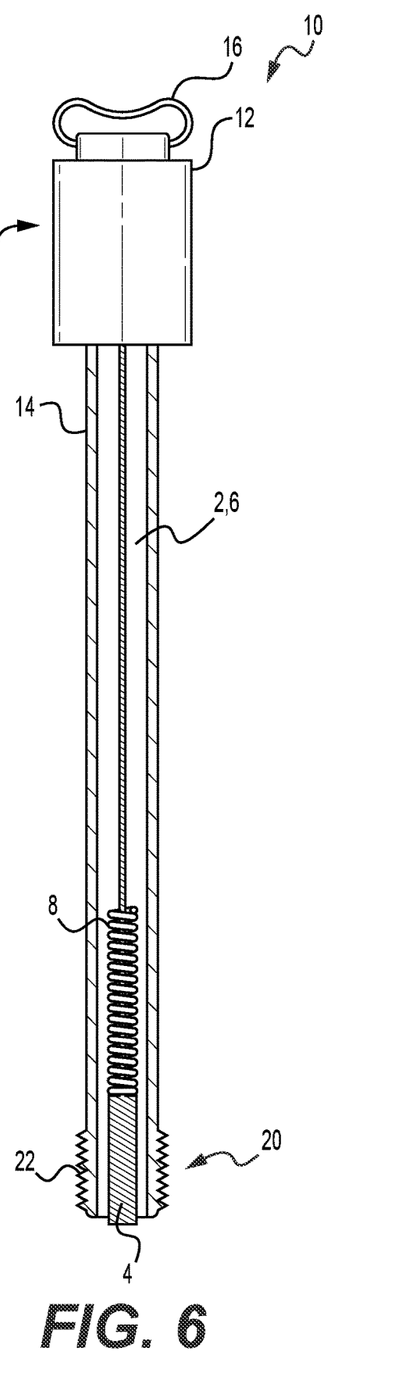
FIG. 6 shows an alternative embodiment of a brush holder according to the present disclosure.

In an alternative embodiment shown in FIG. 6, brush holder 10 includes brush holder extension 14, but brush holder handle 12 does not include any threads. Instead, brush holder extension 14 has threads 22 arranged distally from brush holder handle 12, at contact end 20 of brush holder 10. In this manner, brush holder extension 14 rather than brush holder handle 12 can be fixed (e.g., screwed in) to a component of an electric motor so as to secure brush holder (and SGB 2) to the electric motor.

Figure 7:
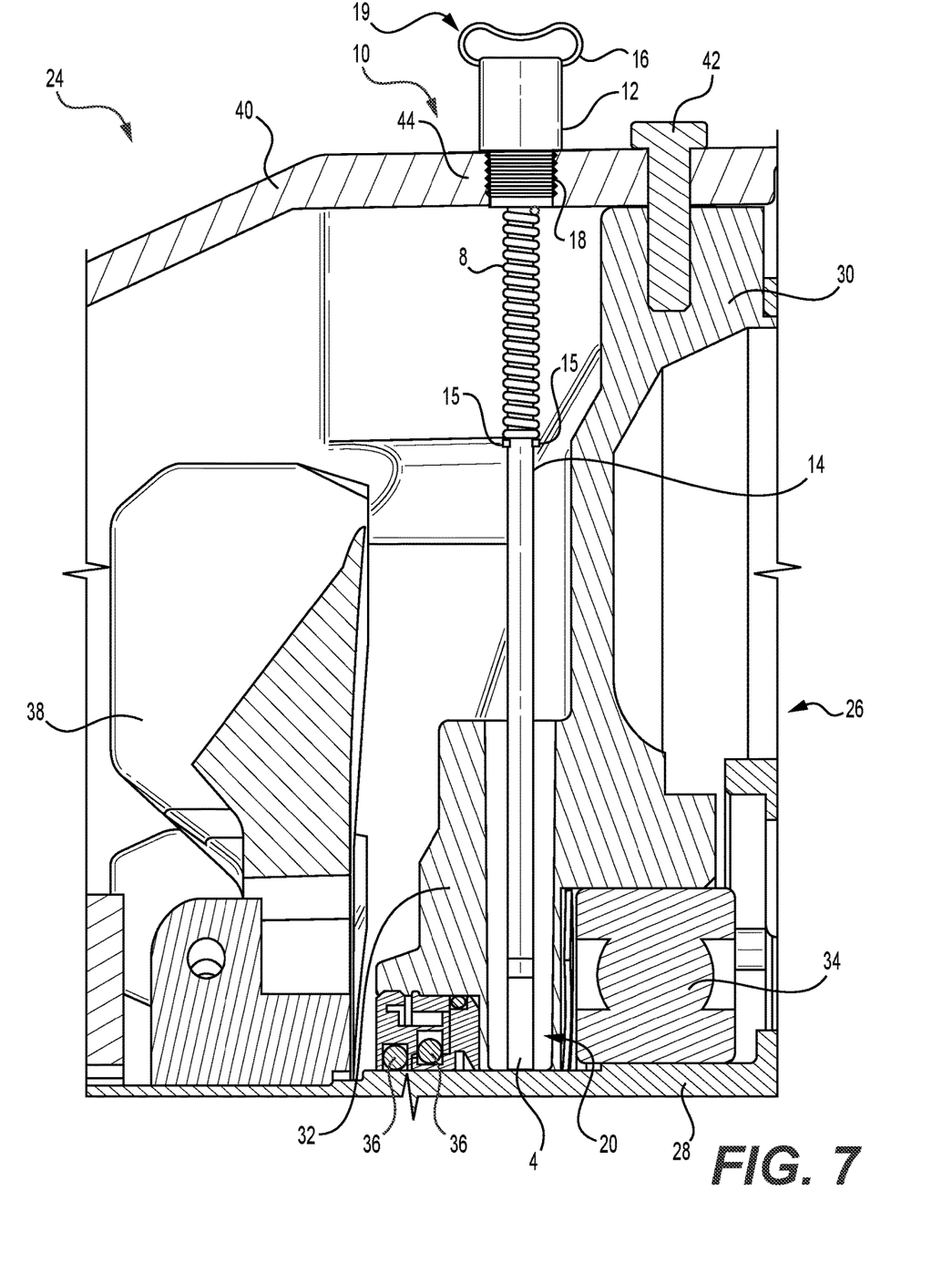
FIG. 7 shows a partial cross-sectional cutaway view of the non-drive end of an electric motor using a brush holder of FIGS. 2-3.

FIG. 7 illustrates a cutaway, partial cross-sectional view of a non-drive end 24 of an electric motor 26. Electric motor 26 includes a rotatable mounted shaft 28, an end bell 30 having an end bell hub 32, and a bearing 34 that facilitates rotation of shaft 28 with respect to end bell 30. One or more shaft seals 36 seal shaft 28 with respect to the environment so as to prevent debris and contaminants from impeding rotation of shaft 28. End bell 30, end bell hub 32, bearing 34, and shaft seals 36 are all arranged circumferentially with respect to shaft 28. End bell 30 may be made, for example, from die cast aluminum or cast iron.

To help cool electric motor 26 during operation, electric motor 26 includes a fan 38 positioned axially outward with respect to end bell hub 32, fan 38 being positioned circumferentially about shaft 28. Electric motor 26 also includes a fan cover 40 secured to end bell 30 by one or more fan cover bolts 42. Fan cover 40 prevents an individual in proximity to electric motor 26 from being injured by fan 38 while electric motor 26 is operating and fan 38 is spinning. Fan cover 40 may be made from stamped steel or cast iron, for example. FIG. 7 shows an electric motor referred as a totally enclosed fan-cooled ("TEFC") motor, as it includes both fan 38 and fan cover 40.

Fan cover 40 includes a fan cover through hole 44 that allows insertion of brush holder 10 therein so that brush holder 10 and SOB 2 are positioned generally between fan 38 and end bell 30. Specifically, brush holder 10 and SOB 2 are insertable in a radial direction through fan cover through hole 44, toward shaft 28 such that brush holder 10/SGB 2 are perpendicularly or transversely arranged with respect to shaft 28. In this manner, brush holder 10 (and SOB 2 that is affixed to it) can be inserted through fan cover 40 at fan cover through hole 44 such that the end of brush holder 10 that includes contact 4 can be inserted into end bell hub 32. When brush holder 10 is screwed into fan cover 40 by way of, for example, threads 18, contact 4 of SGB 2 makes contact with shaft 28 to create a path to ground, as spring 8 exerts tension on contact 4 so as to push contact 4 into shaft 28.

Because fan cover 40 includes fan cover through hole 44, it is not necessary to remove fan cover 40 (e.g., by removing fan cover bolts 42) in order to install a new SGB 2, The present application therefore describes an externally mounted device and system that does not require disassembly of electric motor 26 for service or installation of SGB 2.

If the alternative embodiment of brush holder 10 in FIG. 6 is used, threads 22 can be screwed into a component of electric motor 26 other than fan cover 40 in order to secure brush holder 10 and SGB 2 to electric motor 26. For example, threads 22 could be screwed into end bell hub 32.

Figure 8:
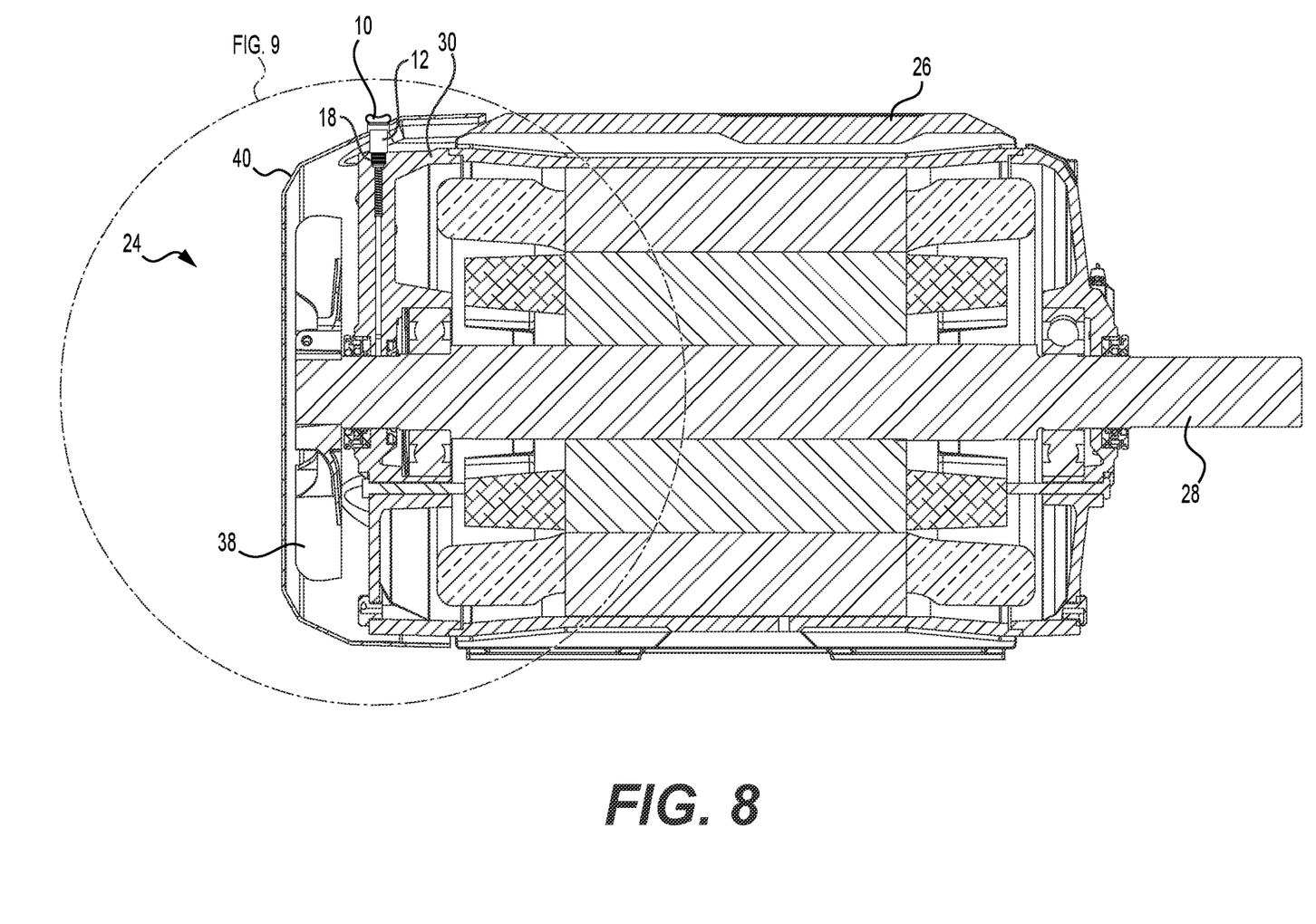
FIG. 8 shows a cross-sectional view of an alternative electric motor using a brush holder according to the present disclosure.
Figure 9:
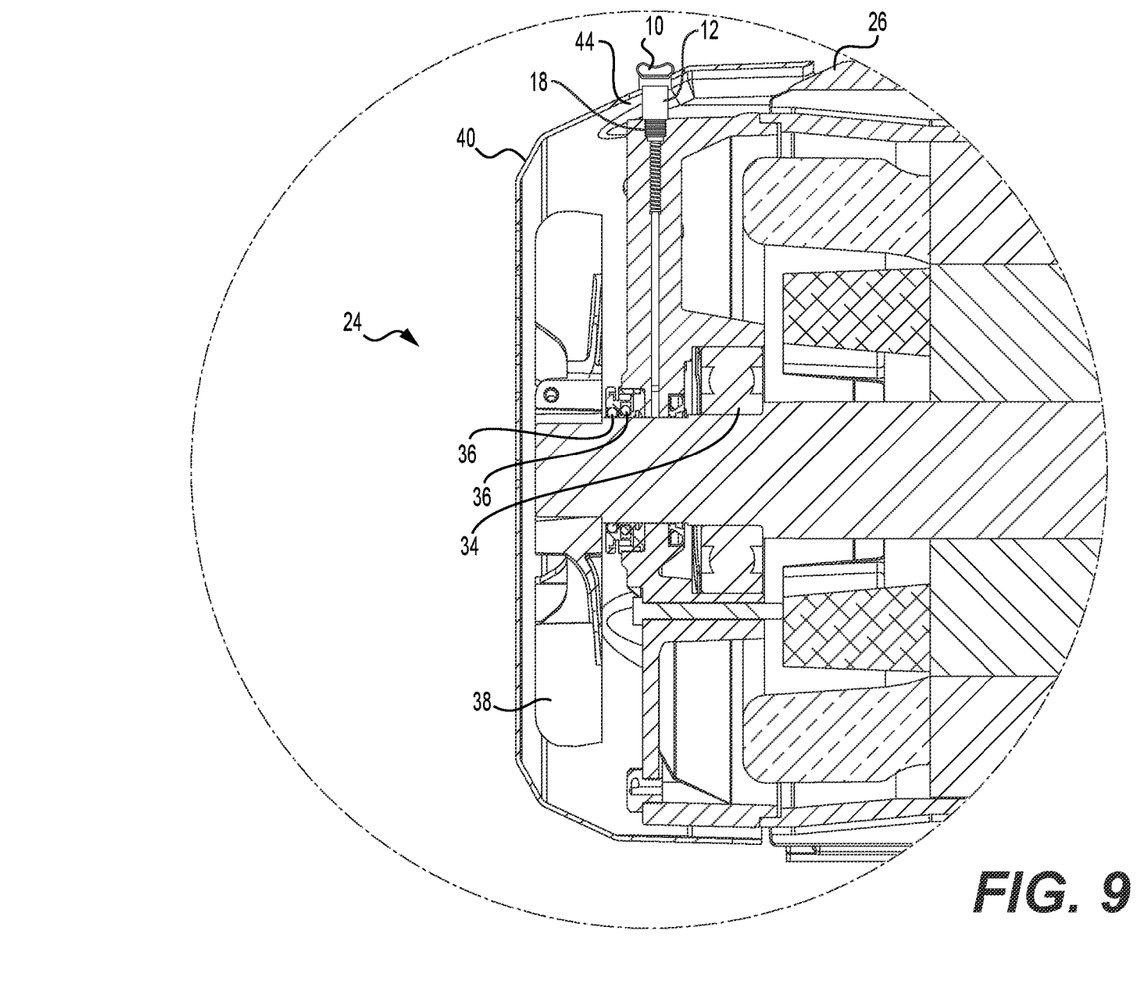
FIG. 9 shows a detail view of FIG. 8.

FIGS. 8-9 show an alternative electric motor that does not include an end bell hub. Such a design is more common for larger electric motors. In this type of electric motor, brush holder 10 can be affixed (e.g., screwed in) to end bell 30 rather than affixed (e.g., screwed in) to fan cover 40. FIG. 9 shows a more detailed view of a portion of FIG. 8.

Figure 10:
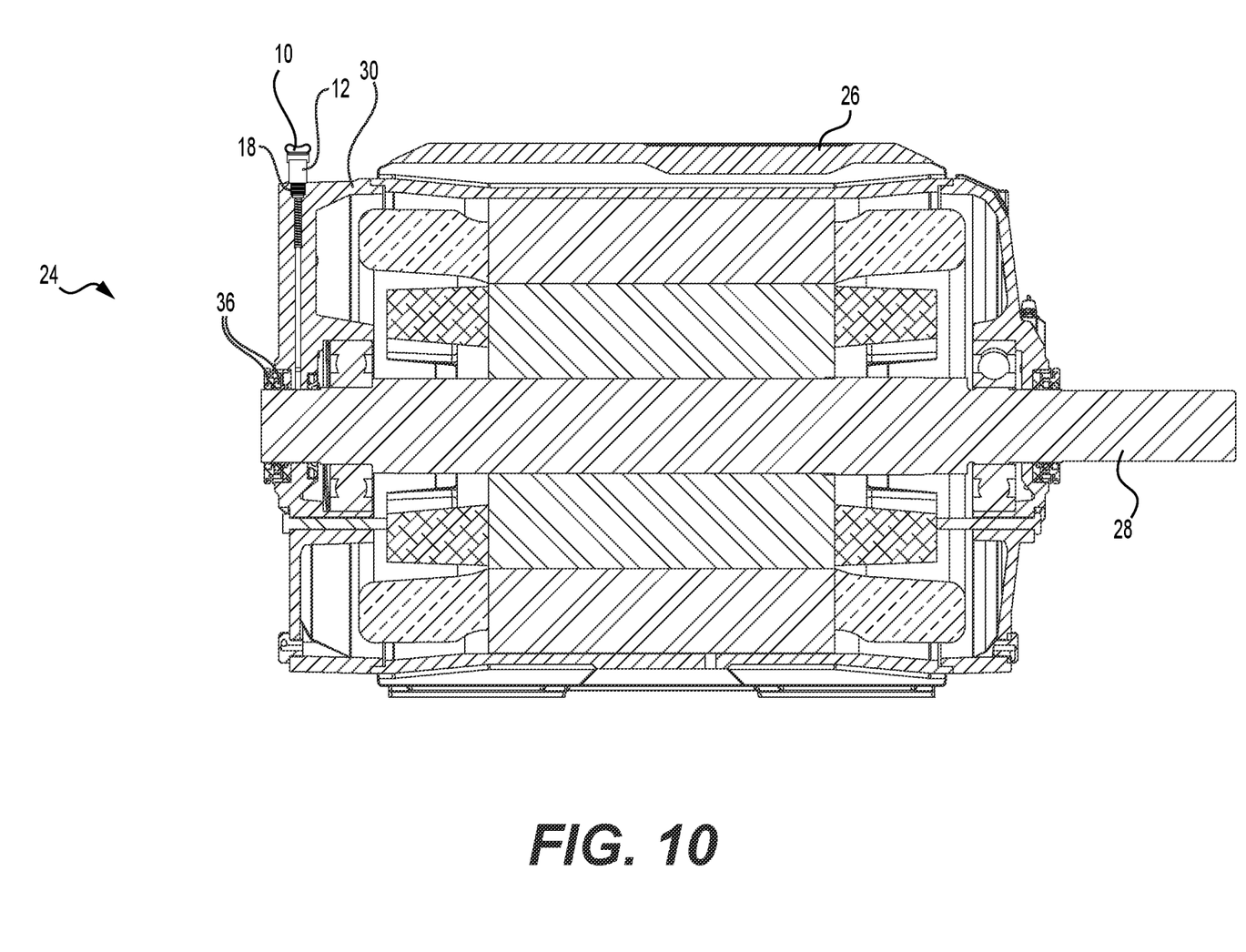
FIG. 10 shows a cross-sectional view of another alternative electric motor using a brush holder according to the present disclosure.

FIG. 10 shows a variation of the electric motor of FIGS. 8-9 without a fan or fan cover. Such electric motors are referred to as totally enclosed non ventilated ("TEM") motors due to the absence of the fan and fan cover. As shown in FIG. 10, shaft 28 extends only slightly beyond end bell 30 and remains sealed by one or more shaft seals 36 and brush holder 10 remains accessible.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A. B and C" should be interpreted as one or more of a group of elements consisting of A, B and C. and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 2 shaft grounding brush (SGB)
4 contact
6 stem
7 tab
8 spring
10 brush holder
12 brush holder handle
14 brush holder extension
15 detents
16 grasping portion
17 proprietary interface
18 threads
19 handle end
20 contact end
21 tab rest
22 threads
24 non-drive end
26 electric motor
28 shaft
30 end bell
32 end bell hub
34 bearing
36 shaft seal(s)
38 fan
40 fan cover
42 fan cover bolt
44 fan cover through hole

What is claimed is:

1. A system for mitigating induced currents in an electric motor having a shaft, the system comprising:
   a brush holder having a handle end, the brush holder comprising:
      a brush holder handle at the handle end;
      a shaft grounding brush attached to the brush holder handle, the shaft grounding brush including a contact at a contact end of the brush holder, the contact end being opposite the handle end;
      a brush holder extension attached to the brush holder handle, the brush holder extension extending between the handle end and the contact end, wherein the shaft grounding brush is disposed at least partially within the brush holder extension, and wherein the shaft grounding brush is removable from the brush holder handle by pulling the brush holder extension through the brush holder handle; and
   an end bell of the electric motor, the end bell being configured to receive the contact end of the brush holder such that the contact of the shaft grounding brush is configured to contact the shaft.

2. The system of claim 1, wherein the brush holder comprises threads configured to engage the end bell so as to affix the brush holder to the electric motor.

3. The system of claim 1, further comprising:
   a fan cover of the electric motor, the fan cover including a fan cover through hole configured to receive the brush holder,
   wherein the brush holder comprises threads configured to engage the fan cover so as to affix the brush holder to the electric motor.

4. The system of claim 1, wherein the brush holder extension comprises threads configured to engage the end bell so as to affix the brush holder to the electric motor.

5. The system of claim 1, wherein the contact of the shaft grounding brush extends beyond the brush holder extension at the contact end of the shaft grounding brush.

6. The system of claim 1, wherein the brush holder includes at least one detent, and
   wherein the shaft grounding brush comprises a spring, the spring being disposed between the at least one detent and the brush holder handle.

7. The system of claim 1, wherein the brush holder handle includes one of a proprietary interface or a standard interface so as to enable rotation of the brush holder with respect to the electric motor.

8. The system of claim 1, wherein the shaft grounding brush comprises a stem with a tab attached thereto at the handle end of the shaft grounding brush,
   wherein the brush holder handle comprises a tab rest, and
   wherein the tab is accommodated in the tab rest when the shaft grounding brush is attached to the brush holder.

9. A brush holder for a shaft grounding brush for an electric motor, comprising:
   a brush holder handle disposed at a handle end of the brush holder;
   a shaft grounding brush attached to the brush holder handle, the shaft grounding brush comprising a stem and a contact attached to the stem, the contact being disposed at a contact end of the brush holder, the contact end being opposite the handle end; and
   a brush holder extension attached to the brush holder handle, the brush holder extension extending between the handle end and the contact end, wherein the shaft grounding brush is disposed at least partially within the brush holder extension, and wherein the shaft grounding brush is removable from the brush holder handle by pulling the brush holder extension through the brush holder handle.

10. The brush holder of claim 9, further comprising: threads disposed at the handle end.

11. The brush holder of claim 9, further comprising: at least one detent,
wherein the shaft grounding brush comprises a spring, the spring being disposed between the at least one detent and the brush holder handle and extending between the contact end and the handle end.

12. The brush holder of claim 9, wherein the brush holder handle includes one of a proprietary interface or a standard interface so as to enable rotation of the brush holder by a user.

13. The brush holder of claim 9, wherein the stem comprises a tab at the handle end of the shaft grounding brush, wherein the brush holder handle comprises a tab rest, and wherein the tab is accommodated in the tab rest when the shaft grounding brush is attached to the brush holder.

14. The brush holder of claim 9, wherein the brush holder extension comprises threads.

15. The brush holder of claim 9, wherein the contact of the shaft grounding brush extends beyond the brush holder extension at the contact end.

16. An electric motor, comprising:
a shaft rotatably mounted inside the electric motor;
a brush holder comprising a brush holder handle, a shaft grounding brush having a contact, and a brush holder extension attached to the brush holder handle, the brush holder having a handle end and a contact end opposite the handle end, the contact being disposed at the contact end, the shaft grounding brush being attached to the brush holder handle, the brush holder extension extending between the handle end and the contact end, wherein the shaft grounding brush is disposed at least partially within the brush holder extension, and wherein the shaft grounding brush is removable from the brush holder handle by pulling the brush holder extension through the brush holder handle; and
an end bell disposed circumferentially around the shaft, the end bell being configured to receive the contact end of the brush holder such that the contact of the shaft grounding brush contacts the shaft.

17. The electric motor of claim 16, wherein the brush holder comprises threads configured to affix the brush holder to the end bell.

18. The electric motor of claim 16, wherein the brush holder is arranged at least one of transversely or perpendicularly with respect to the shaft.

* * * * *